United States Patent [19]

Lester et al.

[11] 4,194,833

[45] * Mar. 25, 1980

[54] ELECTRONIC TYPEWRITER HAVING AN ELECTRONIC DISPLAY

[75] Inventors: Robert W. Lester, Manhasset; Robert Hotto, New York, both of N.Y.

[73] Assignee: Static Systems Corporation, New York, N.Y.

[*] Notice: The portion of the term of this patent subsequent to Aug. 29, 1995, has been disclaimed.

[21] Appl. No.: 794,787

[22] Filed: May 9, 1977

Related U.S. Application Data

[63] Continuation-in-part of Ser. No. 765,339, Feb. 3, 1977, Pat. No. 4,110,794.

[51] Int. Cl.$^2$ .................................................. G03G 15/00
[52] U.S. Cl. ............................... 355/14 CU; 354/5; 355/3 R; 355/67; 355/133
[58] Field of Search .................. 354/3, 4, 5, 6, 7; 355/1, 3 R, 14, 133, 67; 340/337; 358/256

[56] References Cited

U.S. PATENT DOCUMENTS

| | | | |
|---|---|---|---|
| 3,824,604 | 7/1974 | Stein | 355/40 X |
| 3,827,062 | 7/1974 | Mailloux | 354/5 |
| 3,936,172 | 2/1976 | McVeigh | 355/3 R |
| 3,945,018 | 3/1976 | Suwama et al. | 354/6 X |
| 3,952,311 | 4/1976 | Lapeyre | 354/4 X |
| 3,968,501 | 7/1976 | Gilbert | 354/7 |
| 3,982,831 | 9/1976 | Kingsley | 355/5 |
| 4,000,495 | 12/1976 | Pirtle | 354/5 X |
| 4,080,058 | 3/1978 | Stephany et al. | 355/3 R X |
| 4,110,794 | 8/1978 | Lester et al. | 355/40 X |

Primary Examiner—Fred L. Braun
Attorney, Agent, or Firm—Allison C. Collard; Thomas M. Galgano

[57] ABSTRACT

A word processing system for displaying and reproducing alphanumeric characters on a photocopy machine capable of scanning an original document, having a housing including an electronic keyboard with keys representing individual alphanumeric characters, the housing including a display for viewing a portion of the information keys, and a memory circuit coupled to said keyboard for storing and spacing the alphanumeric indicia in memory. A microprocessor circuit, having an algorithm circuit, is coupled to the memory circuit for converting the stored alphanumeric indicia from the memory to a line of dots by comparison with the algorythm circuit; and at least one elongated, solid state reflective display strip, having a single line of reflective dots defining its display screen, is disposed transversely to the scanning direction of the photocopy machine, the strip being coupled to the microprocessor, the microprocessor addressing the proper column of dots in a row to produce the top portion of a complete line of alphanumeric characters on the screen, addressing the same column of dots in the next sequential row, so that the top portion of the characters are shifted one space up to display the adjacent lower portion of the character line on the screen, so that, after a plurality of addressing cycles, the stored alphanumeric indicia, which are converted to a line of dots and reproduced on the screen, are scrolled synchronously in the same direction and at the same speed as the scanning speed of the photocopy machine.

3 Claims, 13 Drawing Figures

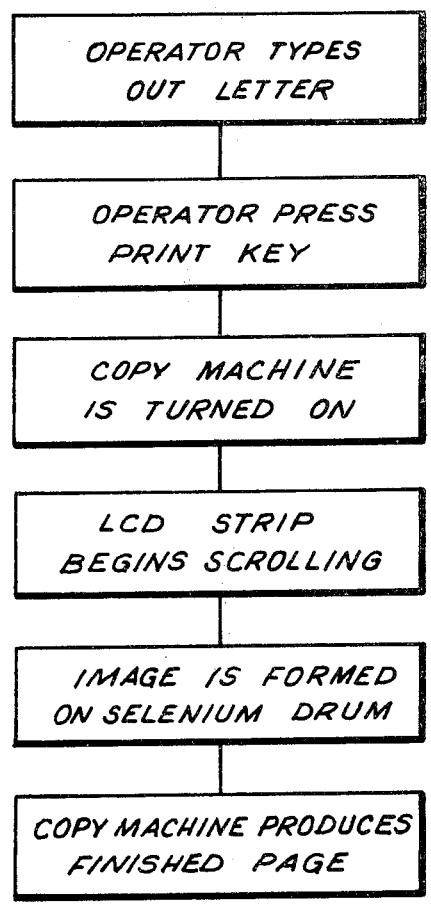
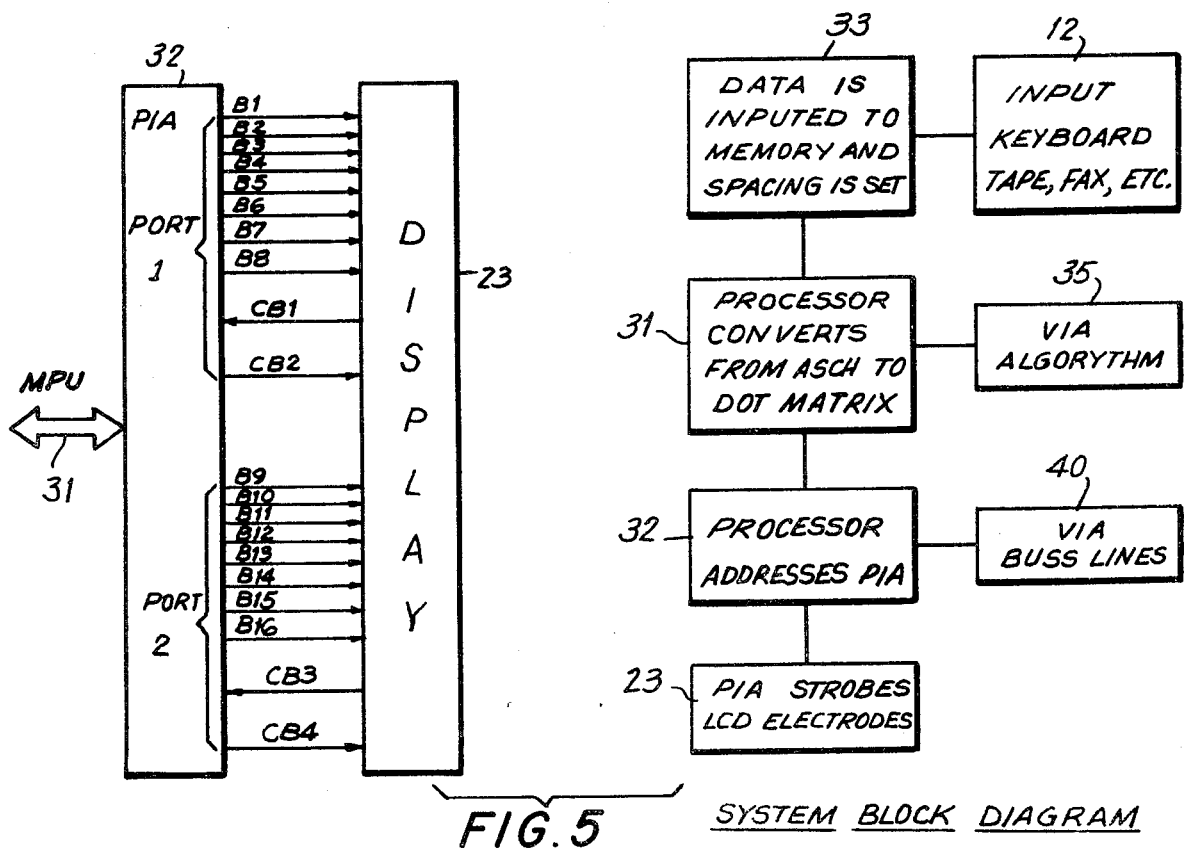
FIG. 4 SYSTEM OPERATION
FIG. 5 SYSTEM BLOCK DIAGRAM

ELECTRONIC TYPEWRITER HAVING AN ELECTRONIC DISPLAY

This application is a continuation-in-part of application Ser. No. 765,339 filed Feb. 3, 1977 now U.S. Pat. No. 4,110,794, issued Aug. 29, 1978.

This invention relates to an electronic typewriter using a liquid crystal display strip in cooperation with a copy machine to produce a finished copy.

More specifically, this invention relates to an electronic typewriter which uses a liquid crystal display strip in cooperation with a copy machine and whereby the liquid crystal strip is scrolled in syncronism with the sweep of the copy machine to produce a printed copy.

Word processing machines, that is typewriters having stored memories first became available to the public during the middle 1960's. IBM Corporation developed the MTST model having a single or dual tape drive which was capable of receiving programmed information from a typewriter and allowing corrections to be made to the program before the final copy was typed. A number of other manufacturers such as Remington, Redactron, Sabin as well as IBM also began producing magnetic card typewriters having single and dual card capability. The typed information was stored on one or more magnetic cards and could be recalled by inserting the card into a card reader at any time. Suitable corrections could be made to the text of the card so that the machines removed the necessity of expensive proof reading of the final material once minor corrections were made to the original copy. More sophisticated word processing machines have also been developed using a full page CRT (cathode ray tube) display such as the Vydec apparatus. This allows a full video display of the typed information before it is transcribed on paper.

There is also a Xerox 1200 Model which consists of a binary information fed or serially fed photocopy machine which, however, employs many moving parts, including a character-generating drum moving at high speed inside the seleninum reproduction drum. The character drum works in combination with a photo-optical generator for reproducing the images on the reverse side of the selenium drum, so that they can be printed after suitable dusting and heat. The images produced by this Xerox method are blurred and this differs from the present invention, which does not have any moving parts or any noise since it is entirely electronic in its character generation.

Almost all of the above machines require the use of of a mechanical printing device for transcribing the recorded information on to a printed page. Some of the word processing devices use a heavy duty IBM selectric typewriter, whereas others use a high speed printer capable of printing approximately 500 words per minute. Newer printers are becoming available using an ink spray deposit method in an attempt to improve the speed of the printout. Where a large number of pages have to be reproduced from stored information, the operator of the word processing machine remains idle for long periods of time until the mechanical printing device can complete the transfer of the information from a memory disc or tape to the printed page.

The conventional word processing machines also suffer from the disadvantage that the mechanical printers are subject to breakdown and require frequent repairs or adjustments during a heavy duty operation. The mechanical printing portion of the word processing machines also represents a substantial cost of the word processor, so that the price to purchase some of the conventional word processors run between $10,000-$18,000. Moreover, the cost of typewriter ribbons for the mechanical processors runs about $200.00 to $500.00 per year, an expense that is eliminated by the present invention.

Accordingly, the present invention provides an electronic typewriter which is electrically coupled to a liquid crystal display (LCD) consisting of a strip of liquid crystal material that is exposed to a standard copy machine such as a dry copier for reproducing alpha-numeric characters. In the invention, the electric keyboard of the typewriter is used to type a letter or report. The alpha-numeric letters which are typed are displayed on a screen either adjacent to or mounted on the typewriter itself so that suitable corrections and additions can be made to the text before it is finalized. After the text is typed, a print button on the typewriter is depressed and the complete text is scrolled line-by-line across the LCD screen and viewed by the optical system of the copier.

The LCD strip is also coupled to a memory such as a RAM and a microprocessor by a peripheral interface adapter. By strobing each electrode connected to the row of dots of the LCD screen, an opaque image is formed on the LCD display. In order to produce a clear image on a xerographic type copy machine where a selenium drum is used to record the image as the drum rotates, the original text either has to be moved or scanned with a moving mirror that is synchronous with the rotation of the drum. As the drum rotates, it must record a different part of the image on each part of its surface. In the present invention, the original consists of an LCD strip which either has to move with the scanning beam or be held stationary and have its image swept onto the selenium drum. In order to recreate the original copy from the LCD strip, a technique is used called "upshift character line mode". This is basically a modified scrolling of the character line on the LCD screen. On the LCD screen, the top portion of a complete line of alpha-numeric characters are produced on the bottom portion of the LCD matrix strip.

In the next time interval this top portion is shifted one space up and now becomes the bottom of the LCD matrix strip and will contain the adjacent lower part of the character line. As the processor continues, the entire character will be formed and the topmost portion of the character will be shifted off the display in the next time interval. This process is accomplished by the techinque of addressing the proper column of dots in the last row, then in the next time interval addressing these same column dots in the next sequential row and adding the lower adjacent part of the character line by addressing the previous row with the proper column dots. This, in effect, shifts the dots up one space and adds to the bottom of the line, the next lower portion of the line. To the copy machine, this creates the illusion of an upward ascending copy in which one is viewing just a line or part of the line through a narrow slit placed over the copy.

The LCD strip coupled to the copy machine and forcused on the selenium drum thus does, in effect, what the original text would do when scanned by a mirror of the unit or moved across the slit of a moving bed type copy machine. The shifting process is made synchronous to the rate of operation of the copy machine or in other words the rate of operation of the rotating selenium drum and that of the moving bed.

It is therefore an object according to the present invention to provide an electronic typewriter using a liquid crystal display strip which is capable of producing alpha-numeric indicia on a photocopy machine.

It is another object according to the present invention to provide an electronic typewriter with a liquid crystal display strip as a printer which is simple in design, easy to construct, and reliable in operation.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

In the drawings, wherein similar reference characters denote similar elements throughout the several views:

FIG. 4 is a system operation diagram detailing the operation of the apparatus;

FIG. 5 is a system block diagram according to the invention;

Figure 6:
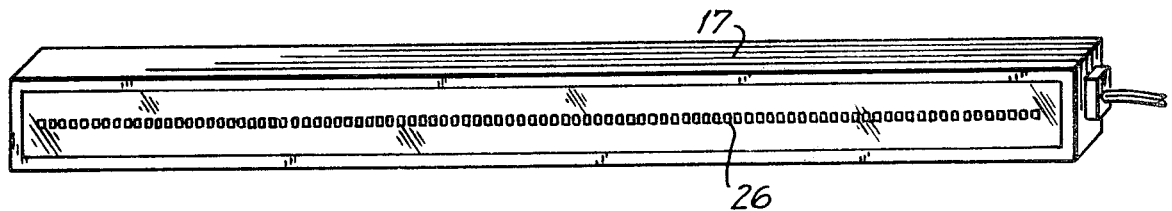
FIG. 6 is a perspective view of another embodiment of an LCD screen using a single dot matrix.

FIGS. 7a-7g disclose the formation of an alpha-numeric character using the screen of FIG. 6.

Figure 1:
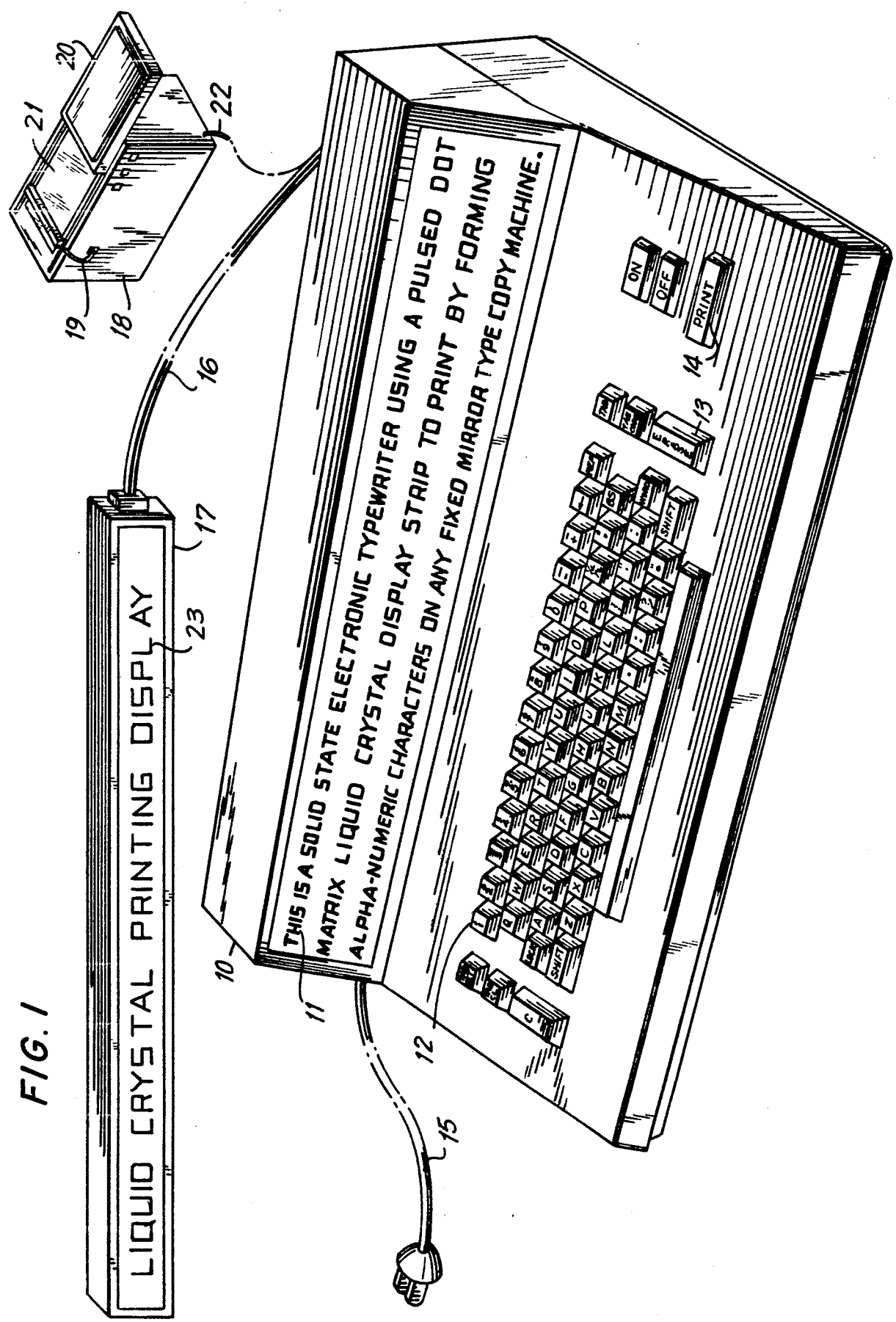
FIG. 1 is a perspective view showing the solid state typewriter coupled to a liquid crystal display strip in cooperation with a copy machine according to the invention.
Figure 2:
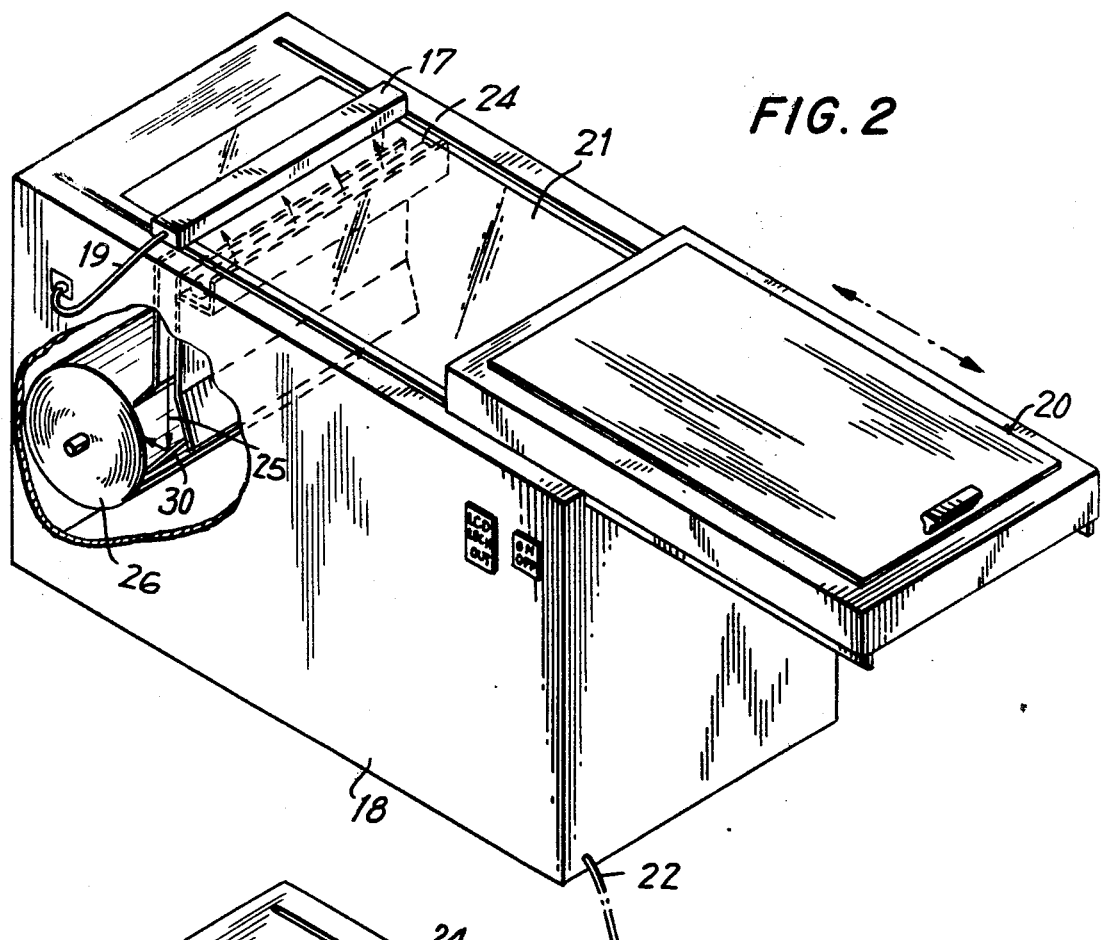
FIG. 2 is a detailed view partly in cross section of the copy machine of FIG. 1 with a liquid crystal display mounted thereon.
Figure 3:
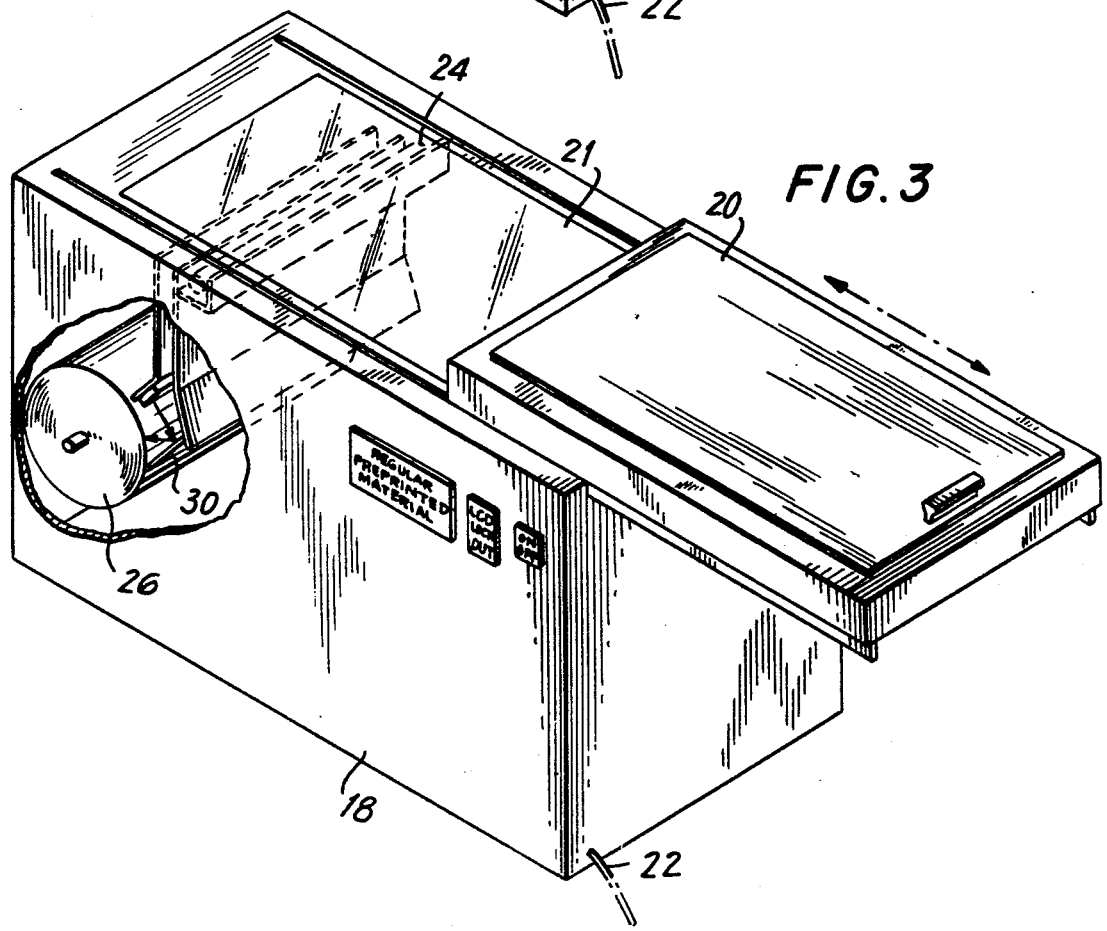
FIG. 3 shows the copy machine of FIG. 2 in another mode of operation with the moving bed locked.

Referring to FIG. 1 there is shown an electronic typewriter 10 having a keyboard with a plurality of keys 12 arranged in a typewriter mode as is well known in the art. The typewriter also includes a built-in, three-line alpha-numeric display 11 on an inclined surface above its keyboard. A conventional, electric power cord 15 serves to connect the typewriter to 110 volts AC. In addition, there is included an erase button and repeat or back-space buttons. The typewriter also includes a solid state memory circuit for storing the typed alpha-numeric display so that when the print button 14 is depressed, the alpha-numeric display 23 on LCD strip 17 will begin to be scrolled line-by-line. When strip 17 is placed on a glass 21 of a photocopy machine 18, the scrolling of the indicia on strip 17 will be reproduced on the selenium drum 26 of machine 18 as shown in FIG. 2. The machine typically includes a high intensity lamp 24 for illuminating the indicia formed on strip 17 when it is placed on open glass 21 of the machine. The machine also has a reflective mirror 30 so that the reflected light travelling along beam 25 will be reflected onto the surface of the drum as the drum rotates. Strip 17 is connected by a line 19 to the machine and the machine is connected via line 22 to an electronic typewriter 10. Under normal operation, the original text would be placed on a moving bed 20 which moves across glass 21 at the same tangential speed as the surface of drum 26 as shown in FIG. 3.

FIG. 4 illustrates the system operation of the invention. After the operator types out the letter and then presses the print key, the copy machine is turned on and the LCD screen begins scrolling the alpha-numeric display from the first line to the last line of the typed letter. The image is continuously formed on the selenium drum of the copy machine and at the end of the scrolling, the machine produces the finished page.

FIG. 5 is an electrical block diagram showing the operation of the system. Microprocessor unit 31 which is fed from typewriter 10 will drive peripheral interface adapter (PIA) 32 which is interconnected to display strip 23 for displaying the alpha-numeric indicia. In the system, block diagram, the input keyboard 12 which could also be a tape or facsimile input feeds into a memory circuit 33 so that the data is stored and spaced in the memory. A microprocessor 31 converts the keyboard indicia from the memory to a single line of dots by comparison with an algorythm 35. The processor then addresses PIA unit 32 via a bussline 40 and the PIA unit strobes LCD display 23 for producing the alpha-numeric indicia.

Figure 7A:
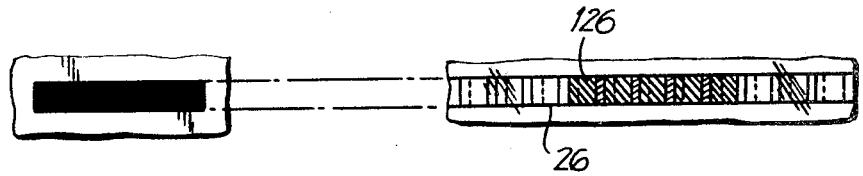
Figure 7B:
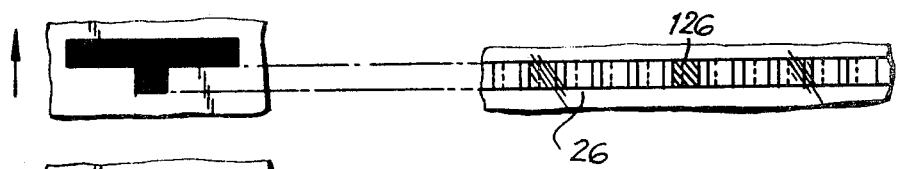
Figure 7C:
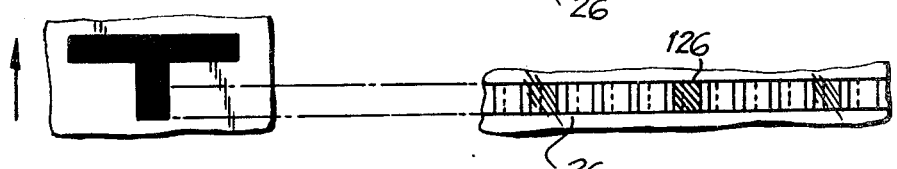
Figure 7D:
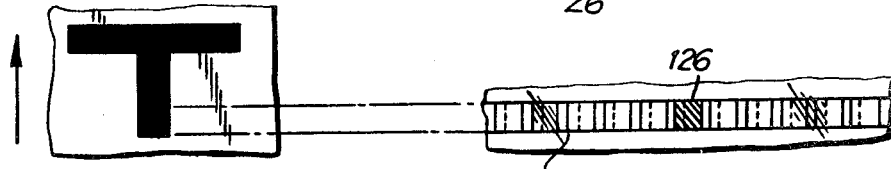
Figure 7E:
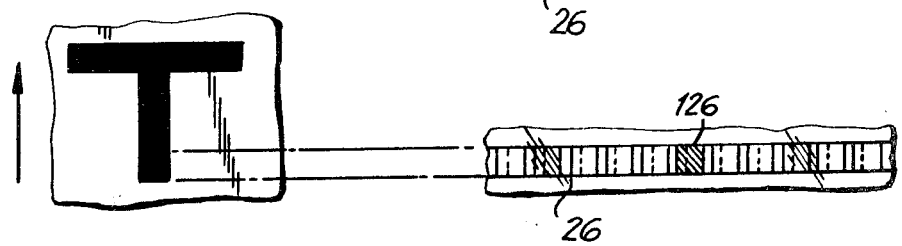
Figure 7F:
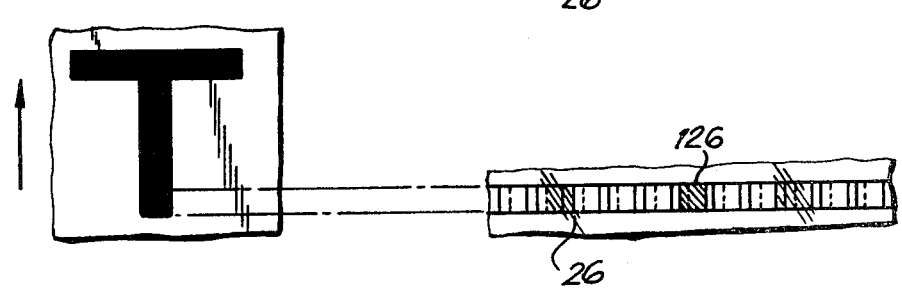
Figure 7G:
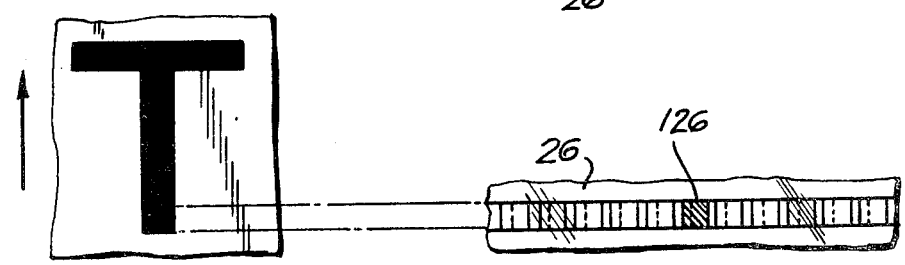

FIG. 6 discloses an LCD strip having only a single line of dots 26 displayed across its screen. It is obvious that more than one row of dots can be provided on the screen if necessary. As shown in FIGS. 7a-7g, when the letter "T" is formed on single row of dots 26, the first appearance of the letter is the top bar of the capital "T" formed by darkening of a group of dots 126 as shown in FIG. 7a. As the photocopy machine scans the single dot row, the image of the bar will be projected on the selenium drum or the photosensitive surface from the single dot row. In FIG. 7b, the stem of the T is formed by a single dot as the drum scans the single dot row. Since the stem of the T is of a finite linear dimension, the single dot will stay darkened on the dot row 26 until the entire stem of the letter is scrolled as shown in FIG. 7g. At that point, the single dot row 26 wil then disappear from the screen and the next letter on the next line below the capital T will begin to be produced.

The LCD dot row strip preferably has a highly reflective white background in order that the strips produce a high contrast of black on white. The operator of the apparatus will also have control over the timing of the shifting LCD strip. This can be accomplished by a software delay loop or a hardware control knob using a variable potentiometer, for example. The delay timing controls the character length and also the width of the spacing between separate lines. By simply trying a few copies, the operator can adjust his keyboard to the varying scan rate of any copying machine with a fixed mirror. Elimination of segmentation in the horizontal row of the dots can be accomplished by a second layer which is superimposed on the first layer and offset slightly to overlap the adjacent layer. The segmentation problem which occurs in a direction transverse to the scrolling can be taken care of by providing a second LCD screen superimposed over the first screen and slightly offset by the width of the segmentation as described in the applicant's earlier application Ser. No. 765,339, now U.S. Pat. No. 4,110,794.

In a typical dot arrangement on an LCD screen, the dots are approximately 20 mils wide separated by 10 mils of open space. It is obvious that the style of type can be altered electronically so that characters can be reproduced in Roman or Gothic style type for example. Moreover, the size of the letters can be adjusted in size and spaced on the paper. For example, if only a short letter is typed, the size of the alpha-numeric indicia can be doubled or tripled and adjusted to fit the remaining space on the letter.

It is also possible to use a reflective character display that is different from liquid crystals. For example, selective plating, electrochromic, PTZL and LETI (Silver/organic electrolyte).

There also exists LCD and electrochromic display devices that can have various colors of opaque characters produced on it by varying the voltage to the particular electrodes or by other means. Variation of voltages are produced by the use of A/D to a converter interfacing the electrodes and the control unit. Coupling this color imaging unit to a color copy machine can allow the operator to produce a color print.

LCD dot displays are manufactured by Itek Corporation of Sunnyvale, Calif., and by Liquid Xtal Displays, Inc. of Cleveland, Ohio.

While only a few embodiments of the present invention have been shown and described, it will be obvious to those skilled in the art that many changes and modifications may be made thereunto without departing from the spirit and scope of the invention.

What is claimed is:

1. A word processing system for displaying and reproducing alphanumeric characters on a photocopy machine capable of scanning an original document, comprising:

a housing including an electronic keyboard with keys representing individual alphanumeric characters, said housing including a display for viewing a portion of the information keyed;

a memory circuit coupled to said keyboard for storing and spacing the alphanumeric indicia in memory;

a microprocessor circuit, having an algorythm circuit and coupled to said memory circuit for converting the stored alphanumeric indicia from the memory to a line of dots by comparison with the algorythm; and at least one elongated, solid state reflective display strip, having a single line of reflective dots defining its display screen, and disposed transversely to the scanning direction of the photocopy machine, said strip being coupled to the microprocessor, said microprocessor addressing the proper column of dots in a row to produce the top portion of a complete line of alphanumeric characters on said screen, addressing the same column of dots in the next sequential row, so that the top portion of the characters are shifted one space up to display the adjacent lower portion of the character line on said screen, so that after a plurality of addressing cycles, the stored alphanumeric indicia are converted to a line of dots and reproduced on said screen, and are scrolled synchronously in the same direction and at the same speed as the scanning speed of the photocopy machine.

2. The word processing system as recited in claim 1 wherein said at least one solid state reflective display strip comprises a liquid crystal display.

3. The word processing system as recited in claim 1, wherein said at least one solid state display strip comprises an electrochromic display.

* * * * *